March 24, 1931.  F. E. McCAUGHEY  1,797,781
PUMP PISTON
Filed May 1, 1930
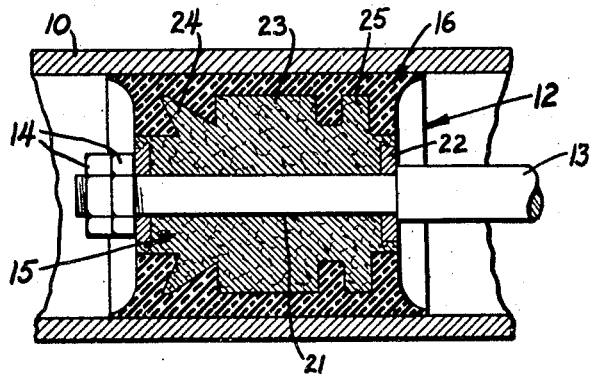
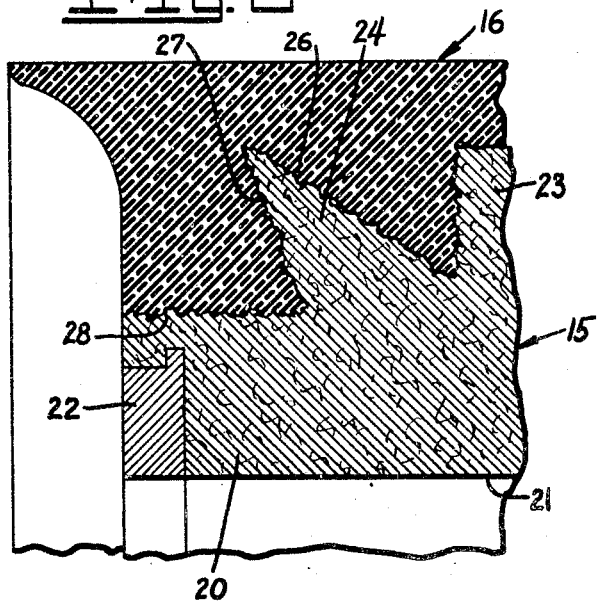
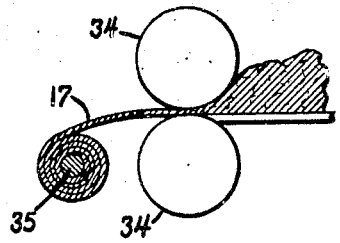
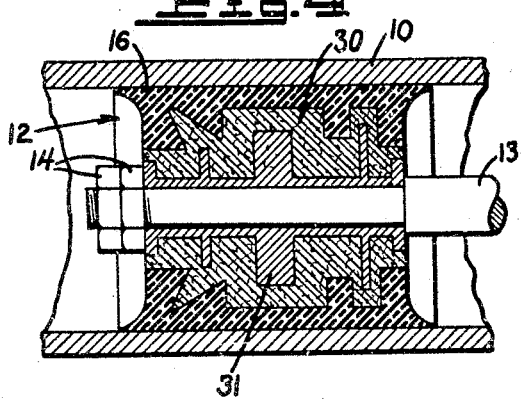
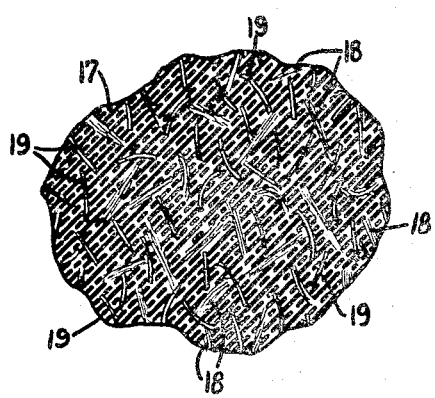
INVENTOR.
F. E. McCAUGHEY.
BY
ATTORNEY.

Patented Mar. 24, 1931

1,797,781

UNITED STATES PATENT OFFICE

FRANK E. McCAUGHEY, OF LOS ANGELES, CALIFORNIA

PUMP PISTON

Application filed May 1, 1930. Serial No. 448,942.

This invention relates to pump pistons.

The general object of the invention is to provide a pump piston which may be used in a slush pump and wherein the piston includes a rubber portion which maintains a fluid tight engagement with the cylinder wall, and an internal or core portion which is secured upon the piston rod.

Another object of the invention is to provide a piston particularly adapted for slush pumps wherein the internal or core portion of the piston comprises a composition of rubber, asbestos and brass strands, with the fibers of asbestos and brass interlaced and permeated with the rubber which is vulcanized to form a rigid mass, and wherein the exterior of the piston is of a soft grade of rubber intimately united to the core.

Another object of my invention is to provide a piston having a core of compressed fiber including rubber and an outer working surface of rubber which is vulcanized to the rubber in the core.

Another object of the invention is to provide a piston having a fibrous core with a rubber wearing surface vulcanized thereto.

A further object of my invention is to provide a method for making pistons wherein a core including fibrous asbestos and brass strands having rubber mixed therewith and vulcanized within a ring of softer rubber to provide a homogeneous mass.

An additional object of my invention is to provide an improved composition of matter including asbestos and brass with vulcanized rubber.

A further object of my invention is to provide a composition comprising a layer of asbestos or other fiber, brass or other strands united by rubber or other composition with the layer vulcanized to a second and softer layer of rubber.

A further object of my invention is to provide a novel method for making a laminated product.

Other objects of my invention will be apparent from the following description taken in connection with the following drawings, wherein:

Fig. 1 is a fragmentary longitudinal section through a pump cylinder showing my improved piston.

Fig. 2 is an enlarged fragmentary section through the packing.

Fig. 3 is a sectional view (greatly magnified) of the core material.

Fig. 4 is a view similar to Fig. 1 showing a modified form of core.

Fig. 5 is a section showing a modification of the method of making the core.

Referring to the drawing by reference characters I have indicated a pump cylinder generally at 10 having a piston 12 positioned therein which is mounted on a pitman 13 and is secured in position by a plurality of nuts 14.

As shown the piston 12 includes a core 15 and a collar 16. The core 15 is made of a composite material comprising by weight approximately 30 percent rubber indicated at 17 in Fig. 3; 20 percent asbestos fibres as indicated at 18; and 50 percent short brass wires indicated at 19. This composite material may be pressed or moulded into various shapes and then machined to provide finished surfaces if desired. The rubber 17 comprises approximately 50 percent crude rubber, 45 percent lamp black and 5 percent sulphur thoroughly mixed.

The asbestos comprises asbestos fibres of varying lengths while the brass strands may be flexible and approximately one-quarter inch in length.

The core 15 includes a hub portion 20 having a central aperture 21 therein and metal washers 22 moulded therein adjacent each end. Intermediate the length of the hub I provide an enlarged flange 23 and between the flange and each end of the hub I provide other flanges 24 and 25. One or more of these flanges may include angular faces such as indicated at 26 and 27 on the flange 24 while another may have plane faces such as in the flange 25.

After the core 15 has been formed the collar 16 is positioned thereon. This collar is preferably made of a good grade of rubber which vulcanizes soft e. g. I may use crude rubber 60 percent, lamp black 38 percent and sulphur 2 percent. To operatively position the collar on the core a cylinder of the desired rubber is positioned on the core which is then placed in a mold where it is subjected to approximately 2000 pounds of pressure for approximately three and three-quarters hours and at a temperature of from 250° to 300°. In this process of vulcanizing the rubber of the core adjacent the periphery thereof and the rubber of the collar become fused together as indicated at 28 in Fig. 2.

The rubber in the core vulcanizes hard so that the core may be machined or drilled while the collar remains relatively soft.

In Fig. 4 I have indicated a slightly modified form of core generally at 30. This modified core is made of the same composite material as the core 15 and is similar in all respects except that the washers 22 are omitted and a metal body 31 is moulded therein.

Instead of molding the core to shape the core material may be formed in laminated sheets 33 by rolling it between a pair of rollers 34 and then winding it on a mandrel 35, layer upon layer, until the desired diameter is obtained. It is then cut to the desired length and vulcanized after which it may be machined to the desired shape and then the packing place thereon and vulcanzied as previously described.

If only a cylindrical core is required the core may be made of layers of laminated sheets of the composite material and then cut to the desired length, after which a collar of the rubber packing material is positioned thereon and both the core and packing vulcanized at the same time.

From the foregoing description it will be seen that I have invented a novel pump piston which is simple in construction and highly efficient in use.

Having thus described my invention, I claim:

1. A piston, said piston including a core and a packing member, said core being made of hard vulcanized rubber and a reenforcement, said packing member being made of rubber, there being an aperture in said core, a flange on said core, said packing member being vulcanized on said core whereby the rubber of said packing member fuses to the rubber in said core.

2. A piston, said piston including a core and a packing member, said core being made of material including rubber, said packing member being made of rubber, there being an aperture in said core, a plurality of enlarged flanges intermediate the length of said core, said packing member being vulcanized on said core whereby the rubber of said packing member is fused to the rubber in said core.

3. A piston, said piston including a core and a packing member, said core being made of a composite material including rubber, said packing member being made of rubber, there being an aperture in said core, a metal washer embedded in said core adjacent each end of said aperture, a flange intermediate the length of said core, other flanges intermediate said first flange and each end of said core, said other flanges including a face inclined relative to the axis of said core, said packing member being vulcanized on said core whereby the rubber of said packing member fuses to the rubber in said core.

4. A piston, said piston including a core and a packing member, said core being made of material including rubber and said packing member being made of a rubber composition, a plurality of flanges on said core intermediate the length thereof, a metal member embedded in said core and including a longitudinal aperture therethrough, said packing member being vulcanized to said core whereby the rubber of said packing member fuses with the rubber of said core.

5. In a pump piston, the combination of a rigid core and a packing member, said core including fibrous asbestos and brass strands united by vulcanized rubber, said packing member including a rubber working surface vulcanized to said core whereby the rubber of the packing member vulcanizes to the rubber of the core.

6. A piston, said piston including a core and a packing member, said core being made of hard vulcanized rubber and a reenforcement, said packing member being made of rubber, said packing member being vulcanized on said core whereby the rubber of said packing member fuses to the rubber in said core.

7. A piston, said piston including a hard rigid core and a relatively soft packing member, said core being made of material including rubber which vulcanizes hard, said packing member being made of rubber which vulcanizes soft, said core including a flange which extends radially from the body of the core, said packing member being vulcanized on said core, whereby the rubber of the packing member is fused to the rubber in the core.

8. A piston, said piston including a core and a packing member, said core being made of hard vulcanized rubber having reenforcing strands distributed therethrough, said packing member being made of rubber, said packing member being vulcanized on said core, whereby the rubber of said packing member fuses to the rubber in said core.

In testimony whereof, I hereunto affix my signature.

FRANK E. McCAUGHEY.